Dec. 26, 1950  O. C. MORRISON ET AL  2,536,009
REFRIGERATOR AND WATER COOLER

Filed Feb. 7, 1948  4 Sheets-Sheet 1

Inventors:
Orville C. Morrison
Samuel O. Morrison
John G. Wehrwein
Earl Gott
by
Attorneys Dec. 26, 1950  O. C. MORRISON ET AL  2,536,009
REFRIGERATOR AND WATER COOLER
Filed Feb. 7, 1948  4 Sheets-Sheet 2

Inventors:
Orville C. Morrison
Samuel O. Morrison
John G. Wehrwein
Earl Gott
by
Attorneys Dec. 26, 1950     O. C. MORRISON ET AL     2,536,009
REFRIGERATOR AND WATER COOLER
Filed Feb. 7, 1948     4 Sheets-Sheet 3
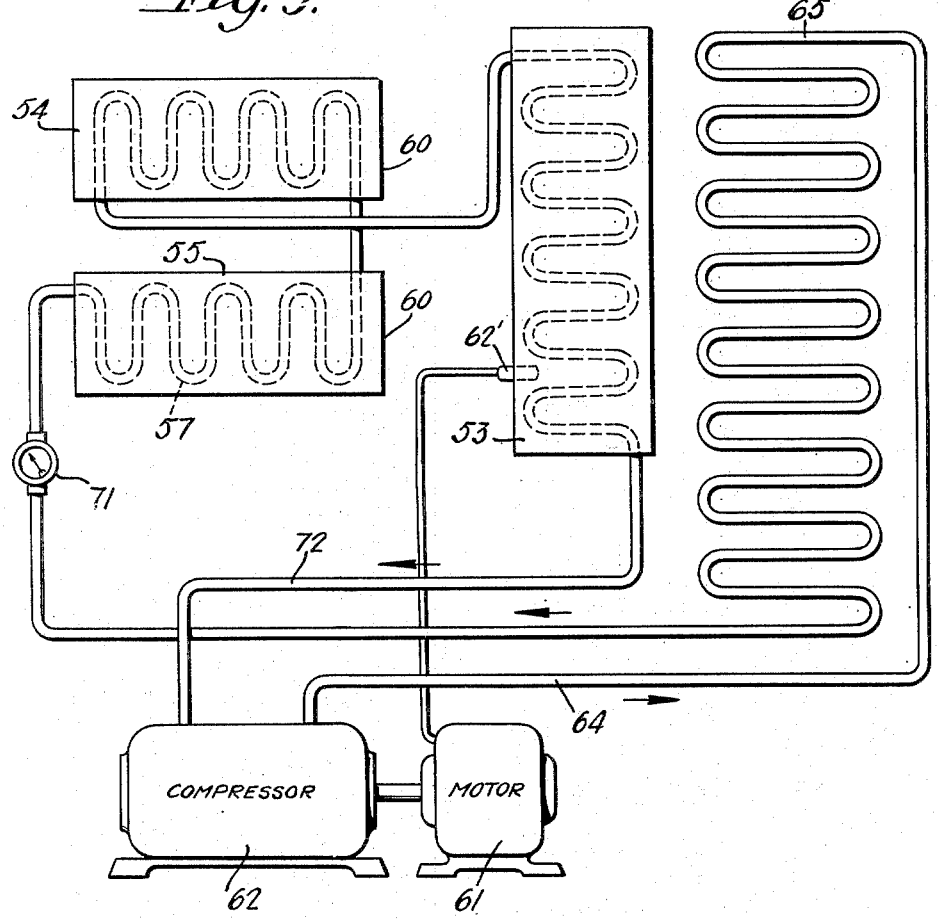
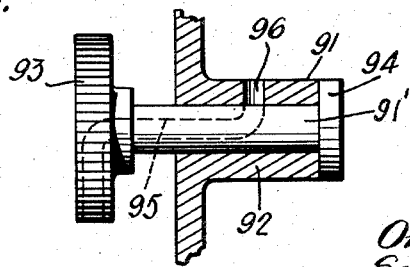
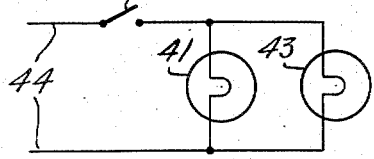
Inventors:
Orville C. Morrison
Samuel O. Morrison
John G. Wehrwein
Earl Gott
by
Attorneys

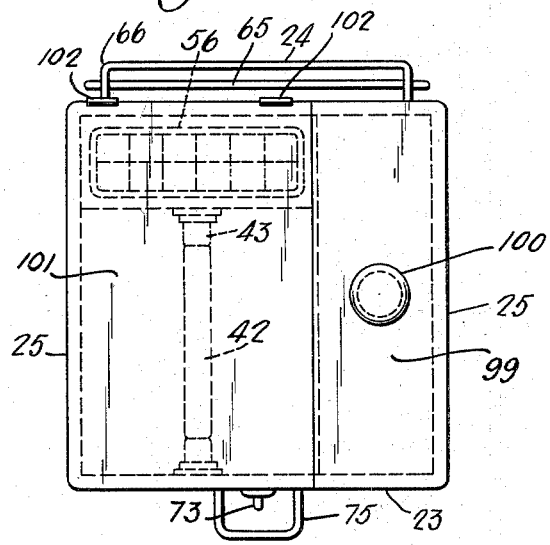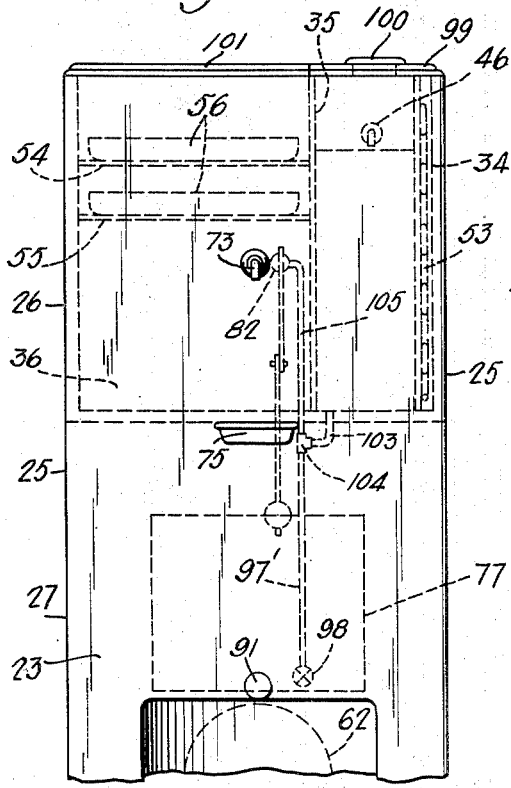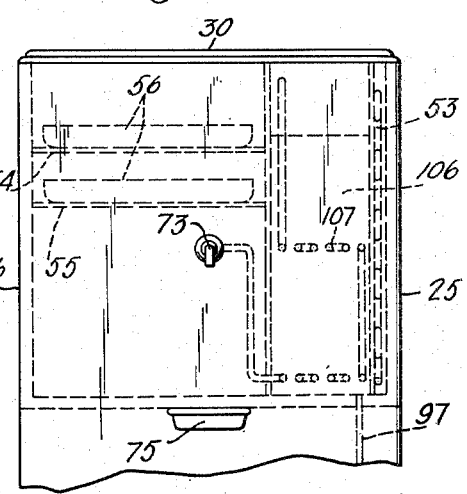

Patented Dec. 26, 1950

2,536,009

UNITED STATES PATENT OFFICE

2,536,009

REFRIGERATOR AND WATER COOLER

Orville C. Morrison and Samuel O. Morrison, Media, John G. Wehrwein, Havertown, and Earl A. Gott, Lansdowne, Pa., assignors to Sunroc Refrigeration Company, Dover, Del., a corporation of Delaware Application February 7, 1948, Serial No. 6,924

4 Claims. (Cl. 62—141)

The invention relates to water coolers and to water coolers combined with refrigerators.

A purpose of our invention is to permit the installation of a refrigerator in a water cooler, whether it be a normal temperature refrigerator with or without ice-making facilities, or a deep freeze or cold storage unit, and preferably to operate the water cooler and the refrigerator from the same mechanical refrigeration facilities.

A further purpose is to permit the location of ice cube trays in a water cooler.

A further purpose is to provide a top opening lid in a water cooler which permits access to a refrigeration compartment, and preferably also to a water cooling compartment with suitable employment of a separate interior lid for the water cooling compartment.

A further purpose is to maintain sterile conditions in a water cooling compartment and desirably also in a refrigeration compartment by a sterile lamp or lamps, and suitably to disconnect the sterile lamps when the compartment or compartments are open.

A further purpose is to provide a static condenser in a vertical flue at the back of a water cooler or combined refrigerator and water cooler.

A further purpose is to conduct drainage from a sump of a water cooler below a dispenser and also from a refrigerator to a waste water storage compartment, and discharge therefrom by a discharge opening which also preferably provides for complete drainage of the water cooling compartment.

A further purpose is to connect the sump to the waste water storage compartment by a pipe which will permit backing up of water from the waste water storage compartment into the sump, and to locate the top of the sump below the food compartment so that water will not correspondingly back up into the refrigerator.

A further purpose is to control inlet to the dispenser by means responsive to the level of water in the waste water storage compartment so that discharge from the dispenser will be cut off when the waste water storage compartment becomes excessively full.

A further purpose is to control inlet to the water cooling compartment by a valve responsive to the level of water in the water cooling compartment.

A further purpose is to bring inlet water into a water cooler in a comparatively thin layer exposed to the light of a sterilizing lamp.

A further purpose is to lead the drinking water out the bottom of the cooling compartment and then through a T, one branch of which is carried up to a dispenser and another branch of which leads down to a drain.

A further purpose in a pressure type cooler is to locate a cooling coil in a cooling water bath, and to carry it therefrom to a dispenser.

A further purpose is to employ a wholly separate outside lid for the food compartment.

Further purposes appear in the specification and in the claims.

In the drawings we have chosen to illustrate one only of the numerous embodiments in which our invention may appear, choosing the forms shown from the standpoints of convenience in operation, satisfactory illustration and clear demonstration of the principles involved.

Figure 5 is a diagrammatic view of the refrigeration system.

Figure 6 is a fragmentary section through the discharge connection.

Figure 7 is a circuit diagram for the sterile lamps.

Figure 8 is a top plan view of a modified water cooler with a refrigeration compartment in accordance with the invention.

Figure 9 is a fragmentary front elevation of the cooler of Figure 8.

Figure 10 is a fragmentary front elevation of a variation in the combined water cooler and refrigerator of the invention.

In the drawings like numerals refer to like parts throughout.

Figure 1:
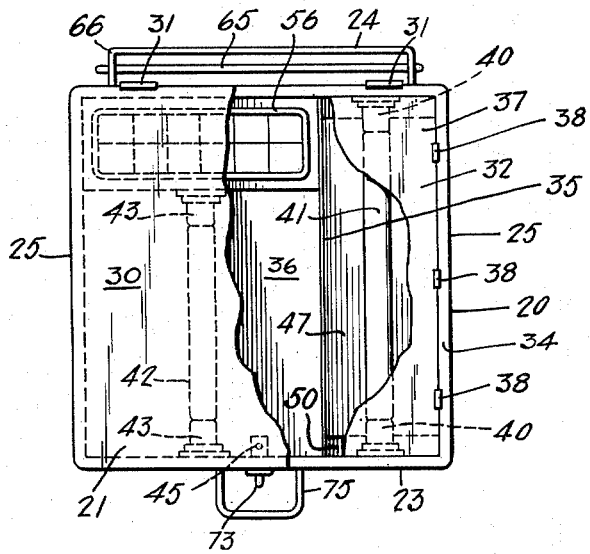
Figure 1 is a top plan view of our improved refrigerator and water cooler, partly sectioned to show the top compartments.

Describing in illustration but not in limitation and referring to the drawings:

In the prior art drinking fountains and water coolers have primarily been exclusively devoted to that function, and in locations such as offices, plants and the like refrigeration facilities for storing of food or making of ice have generally been lacking.

We have discovered that by comparatively simple modification of the refrigeration system employed in a water cooler, the device can also be equipped for food storage or freezing, for industrial low temperature purposes, and for production of ice. This can be done with comparatively simple changes in the refrigeration system normally used for water coolers, and without loss in effectiveness of the water cooling function.

In the improved device a cabinet 20 is used, preferably of generally rectangular form, having a top 21, bottom 22, front 23, rear 24 and sides 25. The upper portion 26 of the cabinet is devoted to refrigeration storage, and the lower portion 27 is primarily concerned with equipment.

Access to the upper portion 26 is provided through a lid or cover 30 which is suitably hinged at 31 at the back and swings open across the entire top. Inside the cover lateral portion 32 is devoted to a water cooler compartment suitably of generally rectangular form and extending to a bottom wall 33 which extends across the refrigeration storage portions. The outer walls and bottom wall of the water cooling compartment, as well as the lid, are suitably provided with insulation 34 which may conveniently extend around the entire outside wall of the upper portion of the cabinet.

A longitudinally extending vertical partition 35 separates the water cooling compartment 32 from a refrigeration compartment 36 which conveniently occupies the remainder of the upper portion of the cabinet.

When the lid 30 is open access may be provided directly to the refrigeration compartment 36, but a separate inner lid 37 hinged at 38, suitably on the side, must be opened after the outer lid 30 has been opened in order to provide access to the top of the water cooling compartment.

The lid 37 conveniently has longitudinally mounted thereon and extending throughout its length, a sterilizing lamp 41 supported by electric sockets 40 and conveniently exposed to the inlet water into the water cooling compartment. A similar sterilizing lamp 42 mounted on sockets 43 is provided on the lower side of outer lid 30 immediately above the center of the refrigeration compartment 36, to provide sterilizing lamp exposure for food stored or frozen in the refrigeration compartment.

As best seen in Figure 7, the sterile lamps are connected to a current source 44 through a switch 45 (Figures 1 and 7) which is located between the lid 30 and the frame of the cabinet to disconnect the lamps when the lid is open. The lamps are suitably in parallel as shown.

Inlet to the water cooling compartment may be provided in any suitable way as by opening up the lids and pouring directly into the water cooling compartment, but the preferred manner of inlet will be by pouring or making water pressure connection to an inlet pipe 46 suitably located adjacent the top of the water cooling compartment and preferably having its inlet end above a generally horizontal baffle 47 so that the inlet water will be spread in a comparatively thin stream or sheet over the baffle and exposed in such thin layer to the sterilizing lamp. This is particularly desirable as the action of the sterilizing lamp is generally not capable of penetrating through a thick layer of water.

The inlet water from the baffle conveniently flows down over the ends at 50 into the water cooling chamber after it has undergone exposure to the sterile lamp.

When pressure connection to the inlet is employed, and desirably in any case, the inlet will be controlled by a valve 51 which responds to the level of water in the water cooling compartment, and suitably cuts off, as by the action of a float 52, when the level rises too high.

Figure 2:
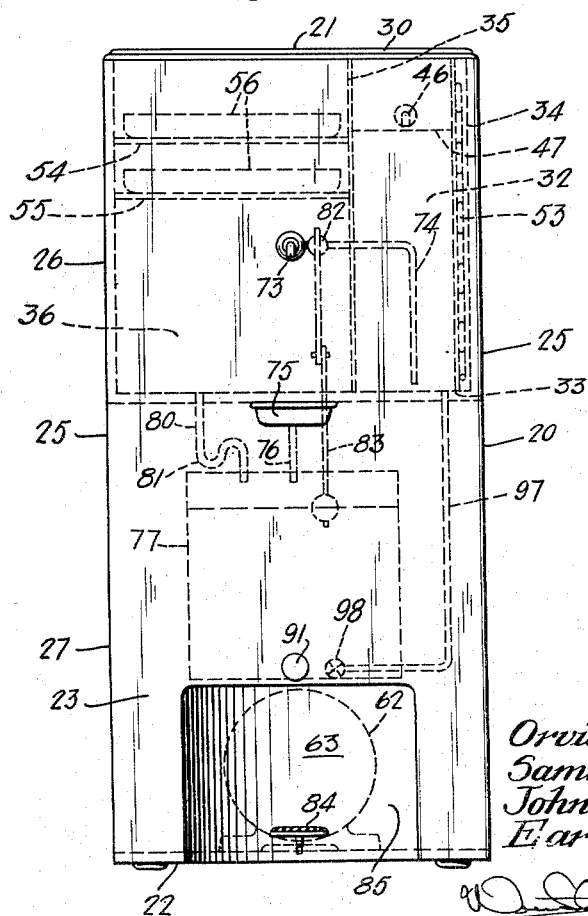
Figure 2 is a front elevation of Figure 1.
Figure 3:
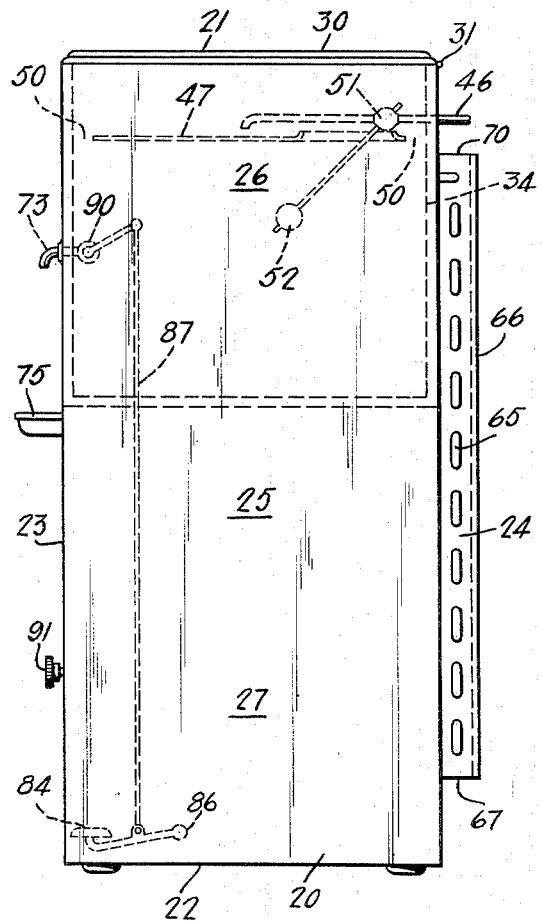
Figure 3 is a right side elevation of Figure 2.
Figure 4:
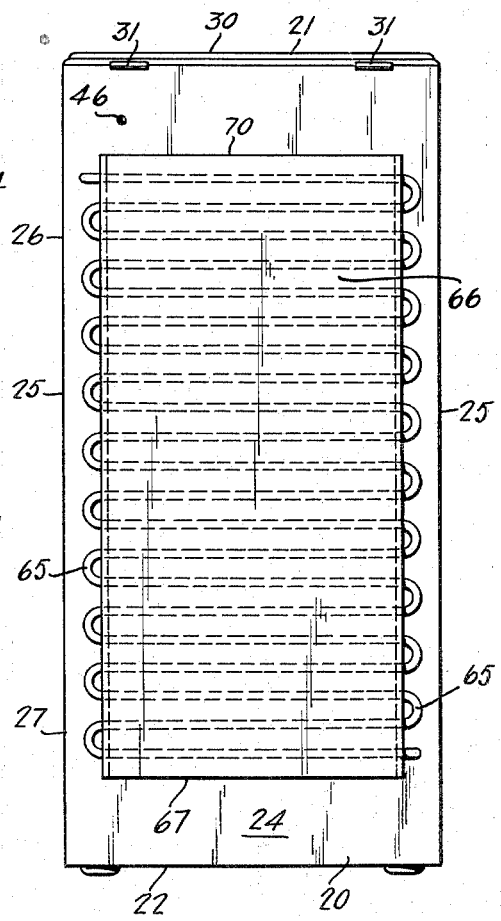
Figure 4 is a rear elevation of Figure 2.

The cooling in the water cooling compartment is conveniently accomplished by a cooling unit 53 desirably located at the outside edge of the water cooling compartment as shown in Figure 2.

The cooling units in the refrigerator compartment may conveniently take the form of shelf elements 54 and 55 arranged one above another conveniently at the back of the refrigeration compartment and supporting ice cube trays 56 for freezing ice. The cooling coils 57 may conveniently by soldered, welded or otherwise joined to the under sides of the sheets 60 making up the shelves. The cooling units 54 and 55 provide adequate cooling capacity for freezing of water, as well as for preserving of food, deep freezing of food, industrial refrigeration for shrink-fitting, retarding precipitation hardening of aluminum alloy rivets or the like, depending upon the particular purpose.

A typical mechanical refrigeration unit is indicated in Figure 5. An electric motor 61 drives a compressor 62, and is suitably combined therewith into a hermetic unit 63 as indicated in Figure 2. The motor is controlled by a thermostatic switch 62' preferably responding to the temperature in cooling unit 53. Suitably compressed refrigerant leaves the compressor through a pipe 64 to a condenser 65. The preferred form of condenser is located in a vertical flue 66 at the back of the cabinet, open at the bottom at 67 and at the top at 70 so that air heated by the refrigerant will rise rapidly because of chimney effect and will cause a vigorous circulation notwithstanding that the condenser is entirely static.

From the condenser cooled refrigerant through a metering device 71, which may be an expansion valve or constrictor, then passes in series through the respective cooling units 55, 54, and 53, after which it returns to the suction side of the compressor through pipe 72.

From the water cooling compartment, water is withdrawn to a water dispenser, which may conveniently be of bubbler or faucet type, but preferably is a faucet 73 as shown, conveniently located at a level some distance above the bottom of the water cooling compartment and connected thereto by a pipe 74 which draws water from the bottom as best seen in Figure 2. This arrangement assures that only a portion of the water in the cooling compartment will be drawn off, the remainder acting to provide quick cooling of inlet water through preventing too sharp a rise in temperature of the water when inlet water is introduced.

The dispenser discharges above a suitable sump or catch basin 75 which catches the waste water and carries it through a pipe 76 into a waste water storage compartment 77. The waste water storage compartment is conveniently located above the compressor and below the sump. The sump is also conveniently located below the bottom of the refrigeration compartment so that any water in the refrigerant compartment can be drained through a connection 80 in the bottom and a trap 81 to the waste water storage compartment 77. The connection between the sump and the waste water storage compartment, and between the refrigeration compartment and the waste water storage compartment will in each case preferably be tight enough so that in case of overfilling of the waste water storage compartment water can back up and show in the sump to warn the user of the requirement of emptying the waste water storage compartment, without leaking out through the connections.

As an additional precaution against overflowing of the waste water storage compartment, a valve 82 is conveniently located in the pipe 74 to the dispenser and is controlled in any suitable manner as by a float and arm 83 suitably sealed against leakage where its operating member leaves the waste water storage compartment, to cut off discharge from the dispenser when the waste water storage compartment is overfilled. The dispenser may, of course, be operated in any suitable way, but this will preferably be accomplished by a foot pedal 84 located in a foot pedal recess 85 from the front of the cabinet at the bottom, and pivoted at 86 to operate a pivotally connected pull rod 87 and a lever control valve 90 pivotally connected thereto, which controls the dispenser.

Discharge from the waste water storage compartment is conveniently accomplished by a valve discharge connection 91 which is available at the front of the cabinet, and conveniently consists of a slidable circular valve shank 91' which moves in and out in a casing 92 under the action of a handle 93 and limited in outward movement by a flange 94. Extending through the shank handle is a discharge opening 95 (Figure 6) which in outer position matches up with a valve opening 96 to permit discharge and in inner position is closed.

It may be desirable in some cases to provide for complete drainage of the water cooling compartment, and therefore a bottom connection 97 is provided controlled by a valve 98 and connecting to the waste water storage compartment.

As seen in Figures 8 and 9, separate lids may be provided for the water cooling compartment and the refrigeration compartment. In this case the water cooling compartment is provided with a normally fixed cover 99 having a removable circular closure 100 for insertion of water or gases for purposes of cleaning. A separate lid 101 hinged at the back at 102 extends over the refrigeration compartment only.

In the form of Figures 8 and 9, water is removed from the water cooling compartment by a bottom connection 103 to a T 104, one branch then being carried up at 105 to the dispenser (through a float valve 82 if desired). The other branch 97' runs to the drain valve 98. This permits a single connection 103 to serve both the dispenser and the drain, avoiding the necessity of making two connections to the water cooling compartment.

In some instances where a pressure type water cooler is being employed, the water cooling compartment will contain a static water bath 106 as shown in Figure 10 and a water coil 107 immersed in the bath will extend thereto and thence to the dispenser 73. The water cooling coil 53 will then be in heat transfer relation with the static water bath which will cool the drinking water in the coil 107.

It will be evident that in accordance with our invention, the top of the cabinet is provided with a food storage, deep freeze and/or ice freezing compartment as well as a water cooling compartment, desirably with separate lids so that access to the refrigeration compartment does not alone permit access to the water cooling compartment.

Both the food or other articles in the food compartment and the water are exposed to the action of sterile lamps, and the inlet water is spread out in a thin film over a baffle as it passes beneath the lamp. The water cooling compartment always maintains a mass of cool water in the bottom which normally cannot be drained.

The condensation of the system is conveniently accomplished entirely by a static condenser in a vertical flue at the back of the cabinet. A waste water compartment is provided with means to prevent overfilling and means to indicate a condition of overfilling in case overfilling nevertheless occurs. Provision is also made for drainage of the water cooling compartment completely when such is necessary.

In view of our invention and disclosure variations and modifications to meet individual whim or particular need will doubtless become evident to those skilled in the art, to obtain all or part of the benefits of our invention without copying the structure shown, and we, therefore, claim all such insofar as they fall within the reasonable spirit and scope of our invention.

Having thus described our invention what we claim as new and desire to secure by Letters Patent is:

1. In a refrigerator and water cooler, a cabinet, a mechanical refrigeration unit including a compressor, a condenser and cooling units in the cabinet, a water cooling compartment at one lateral portion of the top of the cabinet in heat transfer relation with one of the cooling units, a refrigeration compartment at another lateral portion of the top of the cabinet in heat transfer relation with another cooling unit, a water dispenser connected to the water cooling compartment, an interior waste water storage compartment in the cabinet below the water cooling and refrigeration compartments, a sump below the dispenser and above the waste water storage compartment and connected thereto for pouring waste water from the dispenser into the waste water storage compartment, a drainage connection from the refrigeration compartment to the waste water storage compartment, a discharge for the waste water storage compartment, and a selectively open drainage connection from the bottom of the water cooling compartment to the discharge.

2. In a refrigerator and water cooler, a cabinet, a mechanical refrigeration unit including a compressor, a condenser and cooling units in the cabinet, a water cooling compartment at one lateral portion of the top of the cabinet in heat transfer relation with one of the cooling units, a refrigeration compartment at another lateral portion of the top of the cabinet in heat transfer relation with another cooling unit, a dispenser connected to the water cooling compartment, an interior waste water storage compartment in the cabinet below the water cooling and refrigeration compartments, a sump below the dispenser and above the waste water storage compartment and connected thereto for pouring waste water from the dispenser into the waste water storage compartment, a drainage connection from the refrigeration compartment to the waste water storage compartment, a discharge for the waste water storage compartment, and automatic valve means controlled by water level in the waste water storage compartment for cutting off flow through the dispenser when an excessive level is reached in the waste water storage compartment.

3. In a refrigerator and water cooler, a cabinet, a mechanical refrigeration unit including a compressor, a condenser and cooling units in the cabinet, a water cooling compartment at one lateral portion of the top of the cabinet in heat transfer relation with one of the cooling units, a refrigeration compartment at another lateral portion of the top of the cabinet in heat transfer relation with another of the cooling units, a water dispenser connected to the water cooling compartment, an interior waste water storage compartment in the cabinet below the water cooling and refrigeration compartments, a sump below the dispenser and above the waste water storage compartment and connected thereto for pouring waste water from the dispenser into the waste water storage compartment, a drainage connection from the refrigeration compartment to the waste water storage compartment, and automatic valve means controlled by water level in the waste water storage compartment for cutting off flow through the dispenser when an excessive level is reached in the waste water storage compartment, the connection between the sump and the waste water storage compartment permitting water to rise and show in the sump when the waste water storage compartment becomes excessively full, and the top of the sump being below the level of the bottom of the refrigeration compartment.

4. In a water cooler, a mechanical refrigeration unit including a cooling unit, a water cooling compartment in heat transfer relation with the cooling unit, a generally horizontal baffle in the upper part of the water cooling unit, inlet means for flowing water over the baffle, a discharge from the baffle to the water cooling compartment and a sterilizing lamp arranged to subject the top of the baffle to its rays.

ORVILLE C. MORRISON.
SAMUEL O. MORRISON.
JOHN G. WEHRWEIN.
EARL A. GOTT.

REFERENCES CITED

The following references are of record in the file of this patent:

UNITED STATES PATENTS

| Number | Name | Date |
| --- | --- | --- |
| 1,790,236 | Hull | Jan. 27, 1931 |
| 1,825,665 | Hull | Oct. 6, 1931 |
| 1,895,859 | Muffly | Jan. 31, 1933 |
| 1,948,780 | Adams | Feb. 27, 1934 |
| 1,987,947 | Smith | Jan. 15, 1935 |
| 2,010,413 | Peltier | Aug. 6, 1935 |
| 2,039,188 | Reeves | Apr. 28, 1936 |
| 2,052,410 | Kucher | Aug. 25, 1936 |
| 2,160,184 | Wilhelm | May 30, 1939 |
| 2,199,301 | Bonnefoy | Apr. 30, 1940 |
| 2,276,850 | Lemmers | Mar. 17, 1942 |
| 2,341,961 | Tanner | Feb. 15, 1944 |
| 2,425,816 | Maxson | Aug. 19, 1947 |